Figure 1:
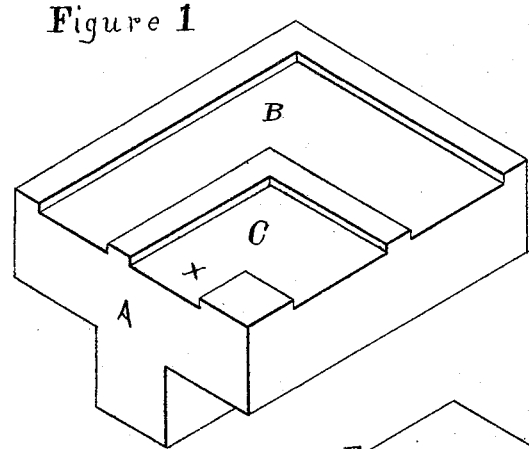

H. K. JONES.
Improvement in Dies for Forging Squares.
No. 127,417. Patented June 4, 1872.

Witnesses
Ruth H. Jones.
Leander P. Jones

Inventor
Horace K. Jones 127,417

UNITED STATES PATENT OFFICE.

HORACE K. JONES, OF KENSINGTON, CONNECTICUT, ASSIGNOR TO HART MANUFACTURING COMPANY, OF SAME PLACE.

IMPROVEMENT IN DIES FOR FORGING SQUARES.

Specification forming part of Letters Patent No. 127,417, dated June 4, 1872.

SPECIFICATION.

I, HORACE K. JONES, of Kensington, in the county of Hartford and State of Connecticut, have invented an Improved Method of Forging Carpenters' Squares, of which the following is a specification:

The first part of my invention relates to a method of scarfing and welding together the two parts of a carpenter's square by a pair of dies, one of which has a beveled projection for scarfing, and a plain face for welding, and the other has suitable recesses for holding the parts in the proper position while being scarfed and welded by the joint action of the dies. The second part of my invention consists in providing the lower jaws of tongs used for welding carpenters' squares with raised lips or edges, which fit the two parts of the square and hold them in proper position while being heated and welded.

The drawing is all in isometrical perspective.

Figure 2:
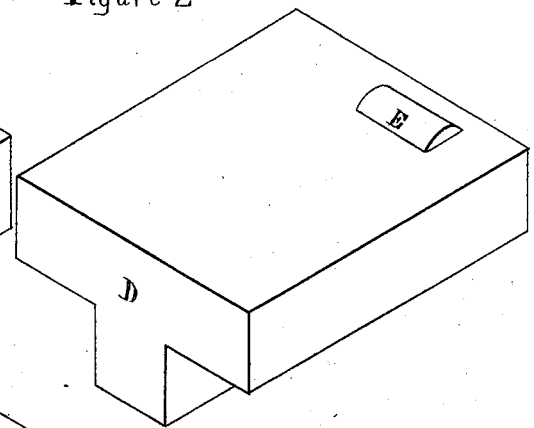
Figure 3:
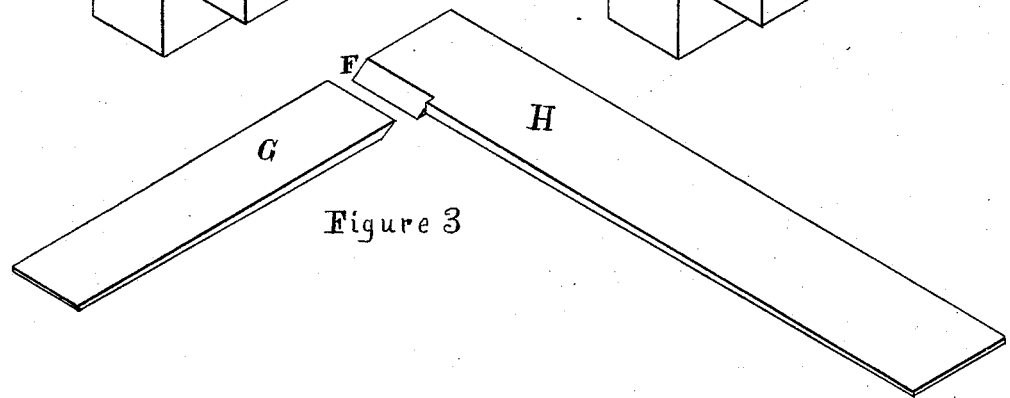
Figure 4:
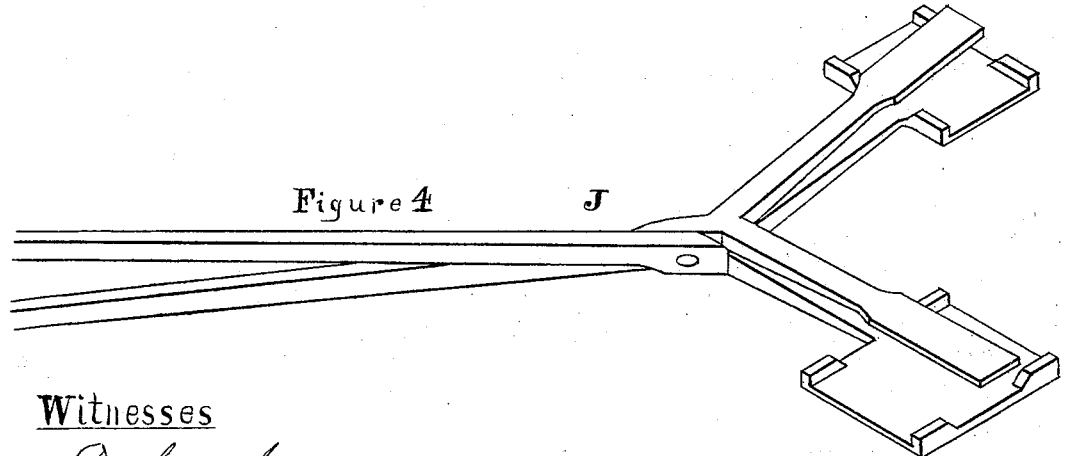

Figure 1 represents the lower die. Fig. 2 represents the upper die. Fig. 3 represents the two parts of the square after being scarfed and before being welded. Fig. 4 represents the improved tongs.

The lower die A is made of steel or hard iron, with a stem on its back, by which it is keyed to the anvil of a trip-hammer or drop-press. This die has an angular recess, B, in its face, which agrees in width and depth with the square which is to be welded. The die A also contains the recess C for scarfing the parts. This is similar to the recess B, but of less extent. Clearance is given to the sides of these recesses, so that the work may be easily removed. The upper die D is of the same size and material as the die A, and is keyed to the hammer so as to match the lower die. The face of D is plain, except the projection E, which fits into the recess C at X when the dies are in contact. The tongs J are made with double jaws, so as to clamp both parts of the square at the same time, and the lower jaws are made very broad, and have raised edges, which fit the two parts and hold them at right angles. These tongs are similar to those heretofore used for welding squares, with the exception of the lower jaws, which have always been made plain, the same as the upper ones. That part of the square marked G is commonly called the "tongue," and the part marked H the "body." These parts are made tapering by being heated and passed between eccentric rolls.

*Operation.*

The thick end of the tongue is heated and inserted a short distance in the recess C at X. The hammer is put in motion, and the action of the projection E "scarfs" or sharpens the end in the manner shown at F. The thick end of the body, being also heated, is placed in the broad part of C, with the end against the angle thereof. The hammer being put in motion as before, the action of E scarfs the edge of the body for a distance corresponding with the width of the tongue, as shown at F. The parts are next placed against projections upon a frame, which brings them to a right angle, with their scarfed surfaces in contact. The tongs are clamped on, and the parts to be welded raised to a welding heat and placed in the recess B. The hammer is then put in motion, and the action of the plain face of the die D welds the parts, leaving the square in the proper form and with a level surface. After the weld is effected a jet of water is thrown upon the lower die and square, and another blow from the hammer removes the scale from the surface of the square, which completes the operation.

By this improved method a better square is produced at less cost than is possible by the method of welding by hand, which has been the exclusive practice hitherto.

*Claims.*

I claim as my invention—

1. As improvements in mechanism for scarfing and welding together the tongue and body of carpenters' squares the die-blocks A and D, provided with recesses B and C and projections E, as set forth.

2. The projecting lips or flanges on the lower jaws of the tongs J, as set forth.

HORACE K. JONES.

Witnesses:
RUTH H. JONES,
LEANDER P. JONES.